(12) United States Patent
Kirzhner

(10) Patent No.: US 6,949,939 B2
(45) Date of Patent: Sep. 27, 2005

(54) METHODS AND APPARATUS FOR MEASURING ROTATING MACHINE CLEARANCES

(75) Inventor: Joseph Dmitry Kirzhner, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 196 days.

(21) Appl. No.: 10/458,657

(22) Filed: Jun. 10, 2003

(65) Prior Publication Data
US 2004/0251916 A1 Dec. 16, 2004

(51) Int. Cl.[7] ............................................. G01R 27/26
(52) U.S. Cl. ...................................................... 324/662
(58) Field of Search ....................... 324/207.15, 207.16, 324/207.26, 662, 635, 658–690; 415/1, 14

(56) References Cited

U.S. PATENT DOCUMENTS

| | | | |
|---|---|---|---|
| 4,069,662 A | * | 1/1978 | Redinger et al. ........... 60/226.1 |
| 4,384,819 A | | 5/1983 | Baker ........................... 415/14 |
| 4,806,848 A | | 2/1989 | Demers ....................... 324/662 |
| 5,101,165 A | | 3/1992 | Rickards ..................... 324/662 |
| 5,119,036 A | | 6/1992 | Rickards et al. ............ 324/662 |
| 5,148,126 A | * | 9/1992 | Spencer ...................... 331/135 |
| 5,166,626 A | | 11/1992 | Hester et al. ............... 324/690 |
| 6,054,866 A | | 4/2000 | Mansfield .................... 324/635 |

* cited by examiner

Primary Examiner—Anjan Deb
Assistant Examiner—Amy He
(74) Attorney, Agent, or Firm—Armstrong Teasdale LLP

(57) ABSTRACT

A method of monitoring a clearance distance between a rotatable member and a stationary member within a rotary machine is provided. The method includes exciting a probe with a first modulation signal when the rotatable member is rotating at less than or equal to a predetermined rate, exciting the probe with a second modulation signal when the rotatable member is rotating at greater than the predetermined rate, measuring the clearance distance between the rotatable member and the stationary member using the probe excited with at least one of the first modulation signal and the second modulation signal.

25 Claims, 3 Drawing Sheets

METHODS AND APPARATUS FOR MEASURING ROTATING MACHINE CLEARANCES

BACKGROUND OF THE INVENTION

This invention relates generally to rotary machines, and more particularly to a clearance measuring system for determining clearance distances between rotating rotary machine members.

At least some known rotary machines use capacitance probe-based clearance measurement systems to monitor rotatable member clearances. Specifically, one such measurement system used in determining turbine blade tip clearance measurement uses a frequency modulated (FM) capacitance probe. Another known system uses DC measurement techniques. FM systems are advantageous in that these systems may be less affected by gas ionization effects that may be present in gas turbines. Specifically, the capacitance tip clearance system measures the capacitance between the probe and the blade tip. The measured capacitance is then related to tip clearance using a pre-determined calibration factor in conjunction with the fundamental relationship for capacitance, $$C = \frac{E_r E_o A}{d},$$

where $E_r$ represents the relative permittivity of the dielectric between the electrodes, $E_o$ represents the permittivity of free space, A represents the electrode area, and d represents the electrode separation. In this case one electrode is the blade tip, the other is a probe mounted on the engine casing.

However, despite the advantages provided with FM systems, at low rotational speeds and zero speed, FM capacitance probe clearance measurement systems may be ineffective. Specifically, at low speeds, the clearance system accuracy decreases and the clearance output decreases to substantially zero at zero speed such that measurements are unreliable.

BRIEF DESCRIPTION OF THE INVENTION

In one aspect, a method of determining a clearance distance between a rotatable member and a stationary member within a rotary machine is provided. The method includes exciting a probe with a first modulation signal when the rotatable member is rotating at less than or equal to a predetermined rate, exciting the probe with a second modulation signal when the rotatable member is rotating at greater than the predetermined rate, measuring the clearance distance between the rotatable member and the stationary member using the probe excited with at least one of the first modulation signal and the second modulation signal.

In another aspect, a clearance measurement system for determining a clearance distance between a rotatable member and a stationary member within a rotary machine is provided. The system includes a probe that includes a measurement face that is sensitive to a proximity of the rotatable member, a switch, selectable between a first position that defines a path from a first pole to a common pole and a second position that defines a path from a second pole to the common pole wherein the switch common pole is electrically coupled to the probe, an amplitude modulation clearance measurement circuit electrically coupled to the first pole of the switch, and a frequency modulation clearance measurement circuit electrically coupled to the second pole of the switch.

In yet another aspect, a rotary machine is provided. The machine includes a stationary member, a rotatable member, rotatable at least partially within the stationary member, a probe mounted in an aperture extending though the stationary member and in communication with the rotatable member, an amplitude modulation clearance measurement channel comprising an amplitude modulation clearance signal amplifier circuit electrically coupled to an amplitude modulation oscillator, a frequency modulation clearance measurement channel comprising a frequency modulation clearance signal amplifier circuit electrically coupled to a frequency modulation oscillator, and a switch that is selectable between the amplitude modulation channel and the frequency modulation channel wherein the switch is electrically coupled to the probe.

DETAILED DESCRIPTION OF THE INVENTION

Figure 1:
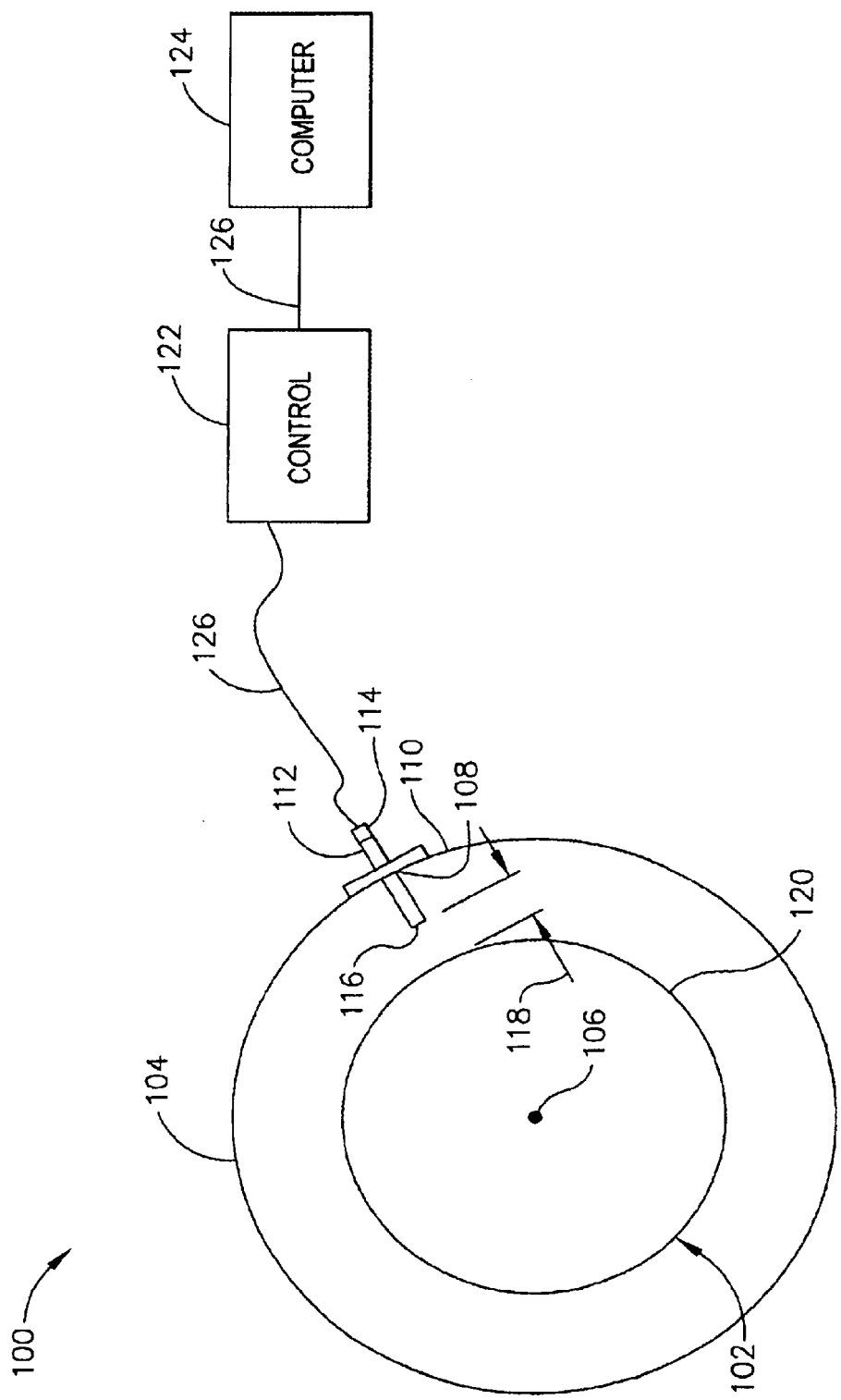
FIG. 1 is a perspective end view of an exemplary rotary machine.

FIG. 1 is a perspective end view of an exemplary rotary machine 100. In the exemplary embodiment, machine 100 is a gas turbine such as a Model 7FB, commercially available from General Electric, Greenville, S.C. Machine 100 includes a rotatable member 102 and a stationary member 104. Rotatable member 102 may include radially extending members (not shown), such as, but not limited to turbine blades, and is configured to rotate about a longitudinal axis 106. Stationary member 104 includes at least one aperture 108 through a sidewall 110. In the exemplary embodiment, aperture 108 includes a mounting adapter 112. In an alternative embodiment, aperture 108 is threaded to receive a capacitance proximity probe 114 directly. Probe 114 extends radially inwardly through aperture 108 toward rotatable member 102. A sensing end 116 of probe 114 is positioned a predetermined distance 118 from an outer periphery 120 of rotatable member 102. Probe 114 is electrically coupled to an electronic control 122 and a computer 124 through one or more instrument cables 126 that may be joined together serially using one or more connectors and/or termination points (not shown). Electronic control 122 is further communicatively coupled to computer 124 to record, display, and process an output of electronic control 122. As used herein, the term computer is not limited to just those integrated circuits referred to in the art as processors, but broadly refers to computers, processors, microcontrollers, microcomputers, programmable logic controllers, application specific integrated circuits, PCs, distributed control systems (DCS) and other programmable circuits.

In operation, probe 114 receives an excitation signal from electronic control 122 such that sensing end 116 is capacitively coupled to objects positioned proximate sensing end 116. In one embodiment, probe 114 receives an amplitude modulated excitation signal. In an alternative embodiment, probe 114 receives a frequency modulated excitation signal. In the exemplary embodiment, probe 114 receives an amplitude modulated excitation signal and a frequency modulated excitation signal alternately depending on an operating condition of machine 100 that may include, but is not limited to, a rate of rotation of rotatable member 102.

Figure 2:
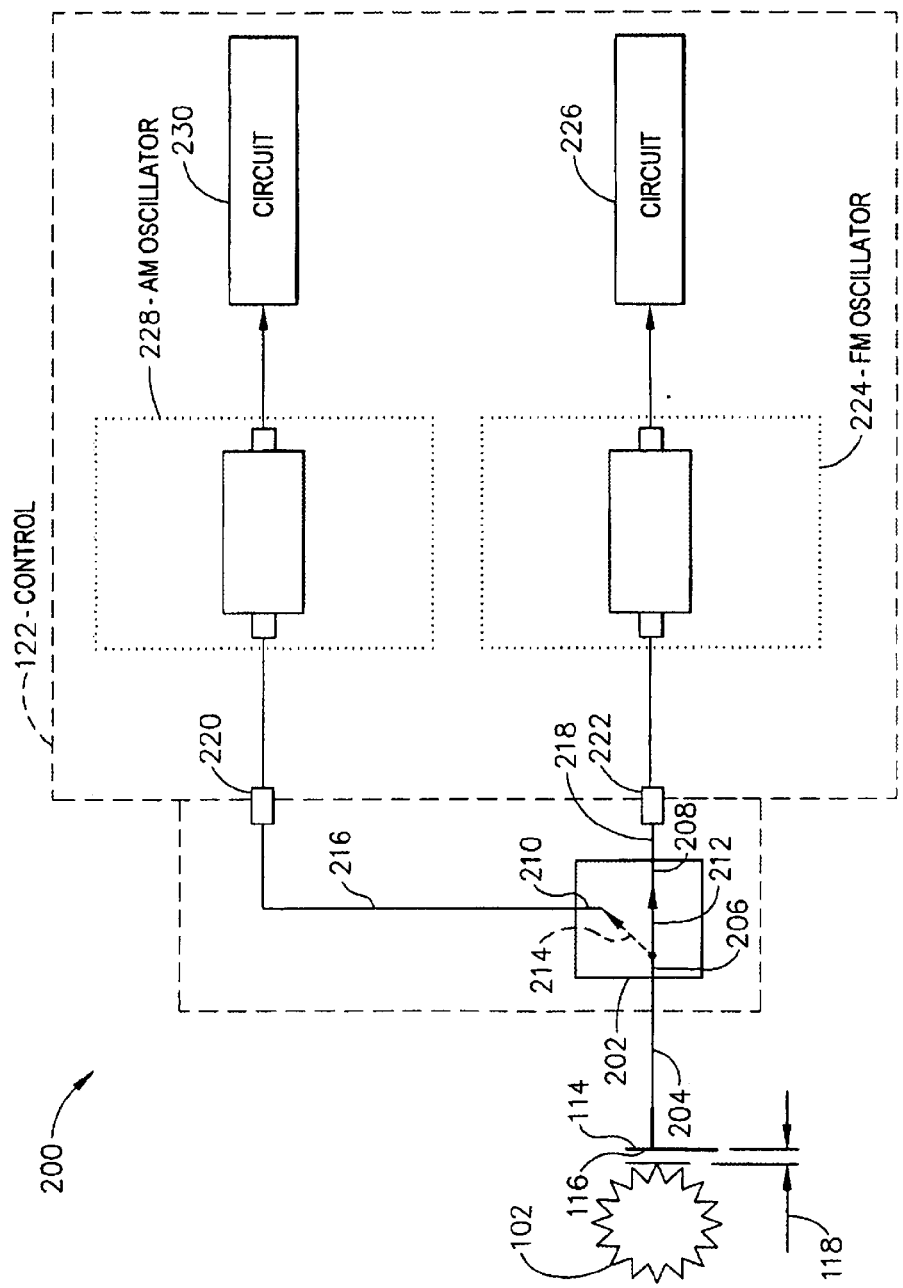
FIG. 2 is schematic diagram of an exemplary clearance measurement system that may be used with the rotary machine shown in FIG. 1.

FIG. 2 is schematic diagram of an exemplary clearance measurement system 200 that may be used with rotary machine 100 (shown in FIG. 1). System 200 includes probe 114 that is electrically coupled to a switch 202 through cable 204. Probe 114 is coupled in capacitive communication with rotatable member 102 and mounted to stationary member 104 (shown in FIG. 1). Switch 202 includes a common pole 206, a first pole 208 and a second pole 210, such that, in a first position 212, an electrical path is defined between common pole 206 and first pole 208, and in a second position 214, an electrical path is defined between common pole 206 and second pole 210. In the exemplary embodiment, switch 202 is an integral component of electronic control 122, mounted within a common enclosure. In an alternative embodiment, switch 202 is mounted separately from electronic control 122 and is electrically coupled through cables 216 and 218 to electronic control 122 through panel connectors 220 and 222, respectively. First pole 208 is electrically coupled to a frequency modulating oscillator 224, which is further coupled to a frequency modulating (FM) measurement circuit. Second pole 210 is electrically coupled to an amplitude modulating (AM) oscillator 228, which is further electrically coupled to an amplitude modulating measurement circuit 230. In the exemplary embodiment, oscillator 228 and circuit 230 are mounted within electronic control 122 and is used in conjunction with switch 202 and oscillator 224 and circuit 226. In an alternative embodiment, electronic control 122 only includes oscillator 224 and circuit 226, and oscillator 228 and circuit 230 are housed in a separate enclosure, and are used instead of oscillator 224 and circuit 226 to excite probe 114 and receive signals from probe 114. In the exemplary embodiment, switch 202 is automatically selectable based on the operating condition of machine 10 (shown in FIG. 1). For example, switch 202 may be configured to select first position 212 when the rate of rotation of rotatable member 102 is greater than a predetermined range, such as approximately five-hundred RPM. At a rate of rotation less than five-hundred RPM switch 202 may select second position 214. Accordingly, switch 202 may be a relay or other switching device that may be controlled from a user's separate control system and/or other logic or processing device. In an alternative embodiment, switch 202 is configured to be manually selectable between fist position 212 and second position 214. The selection is configured to be made through the use of a user control system (not shown) but, may be configured such that the selection is made directly manually at switch 202. Although system 200 is illustrated having only one probe 114, system 200 may include a plurality of probes 114 spaced apart along stationary member 104 such that predetermined areas of interest are monitored during all operating conditions of machine 100. System 200 may also include a respective plurality of oscillators and measurement circuits coupled to the plurality of probes 114.

In operation, oscillator 228 and circuit 230 are electrically coupled to probe 114 through switch 202. System 200 may be calibrated using a calibration station (not shown). Calibration constants are determined from the calibration and are entered into circuits 226 and 230. Oscillator 228 and circuit 230 may be activated to sense a position of rotatable member 102. Rotatable member 102 is then rotated manually to position an area of interest proximate sensing end 116. Distance 118 is measured mechanically using a depth micrometer or other measuring means. The mechanically measured distance 118 is compared to distance 118 measured by system 200 and further calibration coefficients are determined and entered into circuits 226 and 230. During a procedure for aligning the position of rotatable member 102 within stationary member 104, the clearance distance between rotatable member 102 and stationary member 104 is determined using probe 114 that is excited with the first modulation signal and the position of rotatable member 102 with respect to stationary member 104 is adjusted using the measured clearance distance. In the exemplary embodiment, only one probe and associated electronic circuits are shown, but it is anticipated that a plurality of probes and associated electronics may be used to determine clearances at a plurality of points spaced about rotatable member 102 and stationary member 104. By comparing clearance distances at a plurality of measurement points, a relative position and orientation of rotatable member 102 within stationary member 104 may be determined. The position and orientation of rotatable member 102 within stationary member 104 may be adjusted to match a predetermined position and orientation to facilitate aligning rotatable member 102 within stationary member 104. At startup of machine 10, second position 214 is selected to measure machine cold clearances using AM oscillator 228 and AM circuit 230. System 200 monitors clearances of rotatable member 102 with respect to stationary member 104 as rotatable member increases its rate of rotation using AM oscillator 228 and measurement electronics 230 until a predetermined range of the rate of rotation is reached, for example, five-hundred RPM. Switch 202 is switched to first position 212 wherein excitation for probe 114 comes from FM oscillator 224 and the output of probe 114 is transmitted to circuit 226. Other operating conditions of machine 100 may also be used to determine the position of switch 202. The clearance distance that is measured just prior to switch 202 switching from position 214 to position 212 is compared to the clearance distance that is measured just after switch 202 is switched from position 214 to position 212. The clearance distance being measured just prior to switching is being measured by AM oscillator 228 and measurement electronics 230. The clearance distance being measured just after switching is being measured by FM oscillator 224 and measurement electronics 226. A clearance distance difference greater than a predetermined range may indicate a measurement error. System 200 may use the difference to modify calibration constants in measurement circuits 226 and 230 to correct the clearance measurement and/or may signal an alarm indicating a potential error to an operator or a supervisory control system. In the exemplary embodiment, measurement electronics circuits 226 and 230 each comprise a capacitance displacement transducer (CDT) amplifier that transmits a 0–10 $V_{dc}$ capacitance signal which is fed to a 1/V precision converter to output a linear clearance signal over the range 0.1–10 $V_{dc}$ to computer 124. Computer 124 includes data acquisition hardware and executes data acquisition software.

Figure 3:
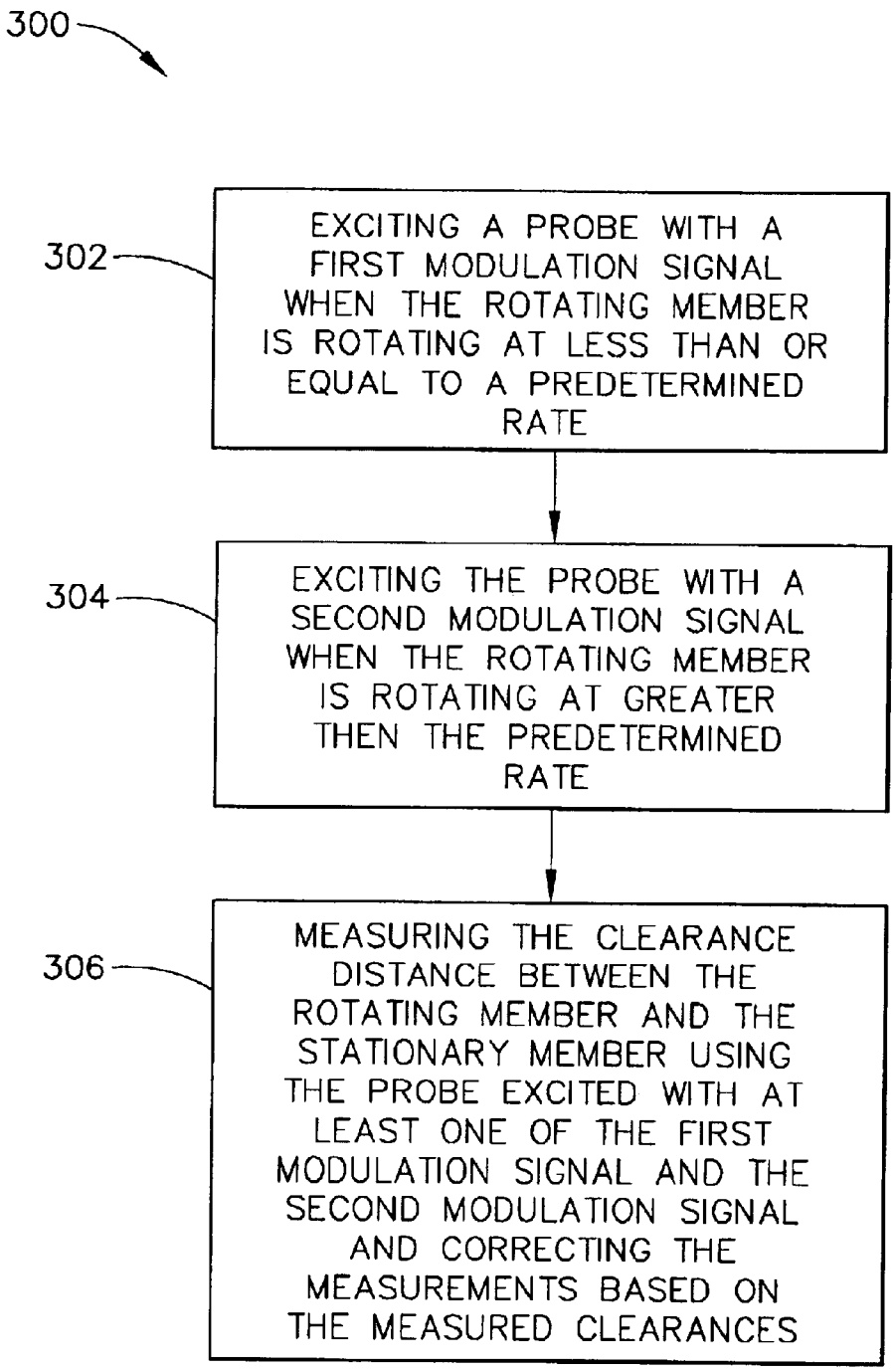
FIG. 3 is a block diagram of an exemplary method of monitoring a clearance distance between a rotatable member and a stationary member within a rotary machine, such as the machine shown in FIG. 1.

FIG. 3 is a block diagram of an exemplary method 300 of monitoring a clearance distance 118 between a rotatable member 102 and a stationary member 104 within a rotary machine 100, such as machine 100 (shown in FIG. 1). Method 300 includes exciting 302 a probe with a first modulation signal when the rotatable member is rotating at less than or equal to a predetermined rate. In the exemplary embodiment, the probe is a capacitance probe that is excited from an AM oscillator with an approximately sixteen kHz sine-wave signal. Method 300 includes exciting 304 the probe with a second modulation signal when the rotatable member is rotating at greater than the predetermined rate. In the exemplary embodiment, after the rotatable member reaches a rate of rotation in the range of approximately five-hundred RPM, a switch device, such as a relay, switches excitation of the probe to a FM oscillator and measurement circuit. Method 300 includes measuring 306 the clearance distance between the rotatable member and the stationary member using the probe excited with at least one of the first modulation signal and the second modulation signal. Using an AM excitation source and measurement circuit at zero or low rotational speed, and using a FM excitation source and measurement circuit at relatively higher rotational speeds facilitates improving the accuracy of the measurements over a wide range of operational conditions. The calibration constants included in software executing on measurement electronics 230 that are used to determine the measured clearance distances may be modified if a difference between the recorded distance value using the first modulation signal and the recorded distance value using the second modulation signal are outside a predetermined range with respect to each other. The excitation of the probe may be switched back to the first modulation signal if a difference between the recorded distance value using the first modulation signal and the recorded distance value using the second modulation signal are outside a predetermined range with respect to each other and modifying the calibration constants does not bring the measurements within the predetermined range. Using the AM excitation source and measurement circuit prior to startup of the machine allows a convenient method of verifying circuit integrity and operational readiness.

The above-described rotary machine clearances measurement system is cost-effective and highly reliable for measuring cold clearances between moving parts in the machine prior to startup, for checking the circuit continuity and operational readiness of the measurement system, and for determining probe position within the machine casing. Specifically, an AM capacitance displacement measuring system is used in conjunction with a FM capacitance displacement measuring system to monitor clearance distances over the operating speed range of the machine. As a result, the methods and apparatus described herein facilitate more accurate monitoring of rotating machinery at reduced labor costs in a cost-effective and reliable manner.

Exemplary embodiments of rotary machine clearances measurement systems are described above in detail. The systems are not limited to the specific embodiments described herein, but rather, components of each system may be utilized independently and separately from other components described herein. Each system component can also be used in combination with other system components.

While the invention has been described in terms of various specific embodiments, those skilled in the art will recognize that the invention can be practiced with modification within the spirit and scope of the claims.

What is claimed is:

1. A method of monitoring a clearance distance between a rotatable member and a stationary member within a rotary machine, said method comprising:
    exciting a probe with a first modulation signal when the rotatable member is rotating at less than or equal to a predetermined rate of rotation;
    exciting the probe with a second modulation signal when the rotatable member is rotating at greater than the predetermined rate of rotation, said second modulation signal is different than the first modulation signal; and
    switching the excitation of the probe from the first modulation signal to the second modulation signal automatically at the predetermined rate of rotation;
    measuring the clearance distance between the rotatable member and the stationary member using the probe excited with at least one of the first modulation signal and the second modulation signal.

2. A method in accordance with claim 1 wherein exciting a probe with a first modulation signal comprises exciting a probe with an amplitude modulation signal.

3. A method in accordance with claim 1 wherein exciting a probe with a second modulation signal comprises exciting a probe with a frequency modulation signal.

4. A method in accordance with claim 1 further comprising:
    recording a clearance distance value using the first modulation signal just prior to switching from the first modulation signal to the second modulation signal;
    switching the excitation of the probe from the first modulation signal to the second modulation signal automatically at the predetermined rate of rotation;
    recording the clearance distance value using the second modulation signal just after switching from the first modulation signal to the second modulation signal; and
    modifying at least one calibration constant of a software calibration equation if a difference between the recorded distance value using the first modulation signal and the recorded distance value using the second modulation signal are outside a predetermined range with respect to each other.

5. A method in accordance with claim 4 further comprising generating an alarm signal if a difference between the recorded distance value using the first modulation signal and the recorded distance value using the second modulation signal are outside a predetermined range with respect to each other.

6. A method in accordance with claim 4 further comprising switching the excitation of the probe from the second modulation signal to the first modulation signal automatically if a difference between the recorded distance value using the first modulation signal and the recorded distance value using the second modulation signal are outside a predetermined range with respect to each other.

7. A method in accordance with claim 1 further comprising switching excitation of the probe from the first modulation signal to the second modulation signal manually.

8. A method in accordance with claim 1 further comprising measuring the clearance distance between the stationary member and the rotatable member substantially continuously between a zero rotational speed and a predetermined rotational overspeed limit.

9. A method in accordance with claim 1 further comprising:
    measuring the clearance distance between the rotatable member and the stationary member using the probe excited with the first modulation signal; and
    adjusting the position and orientation of the rotatable member with respect to the stationary member using the measured clearance distance to align the rotatable member within the stationary member.

10. A method in accordance with claim 1 wherein the probe is selectively, electrically coupled to at least one of a first clearance signal amplifier circuit through the first modulation signal oscillator, and a second clearance signal amplifier circuit through the second modulation signal oscillator, and wherein measuring the clearance distance between the rotatable member and the stationary member comprises:
    receiving a probe signal by at least one of the first clearance signal amplifier circuit and the second clearance signal amplifier circuit;

correlating the received signal to a clearance distance between the rotatable member and the stationary member;

measuring the clearance between the rotatable member and the stationary member; and calibrating the first and second clearance signal amplifier circuit based on the measured clearance.

11. A method in accordance with claim 10 wherein measuring the clearance distance between the rotatable member and the stationary member comprises measuring the cold clearance distance between the rotatable member and the stationary member.

12. A method in accordance with claim 11 wherein the probe is mounted in an aperture that extends through the stationary member, and wherein measuring the cold clearance distance comprises measuring the cold clearance distance using a mechanical measurement device that at least partially extends through the aperture to contact the rotatable member.

13. A clearance measurement system for monitoring a clearance distance between a rotatable member and a stationary member within a rotary machine, said system comprising:

a probe comprising a measurement face that is sensitive to a proximity of said rotatable member;

a switch, selectable between a first position that defines a path from a first pole to a common pole and a second position that defines a path from a second pole to the common pole, said switch common pole electrically coupled to said probe;

an amplitude modulation clearance measurement circuit electrically coupled to the first pole of said switch; and a frequency modulation clearance measurement circuit electrically coupled to the second pole of said switch.

14. A clearance measurement system in accordance with claim 13 wherein said rotatable member is a turbine rotor assembly.

15. A clearance measurement system in accordance with claim 13 wherein said probe is a capacitance probe.

16. A clearance measurement system in accordance with claim 13 further comprising a plurality of probes, each said probe associated with a switch, an amplitude modulation clearance measurement circuit, and a frequency modulation clearance measurement circuit.

17. A clearance measurement system in accordance with claim 13 wherein said switch is selectable at least one of manual input from a user and automatically based on a predetermined operating condition of said rotary machine.

18. A clearance measurement system in accordance with claim 17 wherein said switch is selectable based on a predetermined rate of rotation of said rotatable member.

19. A clearance measurement system in accordance with claim 18 wherein said switch selects the first position when the rotatable member rate of rotation is less than the predetermined rate of rotation.

20. A clearance measurement system in accordance with claim 18 wherein said switch selects the second position when the rotatable member rate of rotation is greater than or equal to the predetermined rate of rotation.

21. A rotary machine comprising:

a stationary member;

a rotatable member, rotatable at least partially within said stationary member;

a probe mounted in an aperture extending though said stationary member and in communication with said rotatable member;

an amplitude modulation clearance measurement channel comprising an amplitude modulation clearance signal amplifier circuit electrically coupled to an amplitude modulation oscillator;

a frequency modulation clearance measurement channel comprising an frequency modulation clearance signal amplifier circuit electrically coupled to a frequency modulation oscillator; and a switch selectable between said amplitude modulation channel and said frequency modulation channel electrically coupled to said probe.

22. A rotary machine in accordance with claim 21 wherein said probe comprises a capacitance probe configured to receive an excitation signal and to generate an output signal related to a proximity of said inner member to a measurement face of said probe.

23. A rotary machine in accordance with claim 22 wherein said probe is configured to receive a frequency modulated excitation signal.

24. A rotary machine in accordance with claim 22 wherein said probe is configured to receive an amplitude modulated excitation signal.

25. A rotary machine in accordance with claim 21 wherein said switch is selectable at least one of manually and automatically based on a predetermined rate of rotation of said rotatable member.

* * * * *